United States Patent
Cowie

(10) Patent No.: US 6,685,208 B1
(45) Date of Patent: Feb. 3, 2004

(54) BALANCE SYSTEM FOR AN ENCLOSED FORE-AND-AFT WHEELED VEHICLE

(76) Inventor: Ross L. Cowie, 1110 Plante Drive, Ottawa ON (CA), K1V 9E7

( * ) Notice: Subject to any disclaimer, the term of this patent is extended or adjusted under 35 U.S.C. 154(b) by 0 days.

(21) Appl. No.: 10/298,563

(22) Filed: Nov. 19, 2002

(51) Int. Cl.$^7$ ................................................. B62H 1/00
(52) U.S. Cl. ................................................. 280/293
(58) Field of Search ........................... 280/293–303, 280/264.1, 766.1, 755

(56) References Cited

U.S. PATENT DOCUMENTS

| | | | |
|---|---|---|---|
| 502,298 A | 8/1893 | Hyams | |
| 1,152,821 A | * 9/1915 | Kurtz | 180/230 |
| 1,730,282 A | * 10/1929 | Mc Clure | 180/226 |
| 1,796,339 A | * 3/1931 | Nicholson | 180/209 |
| 1,858,743 A | 5/1932 | Langstreth | |
| 2,398,541 A | * 4/1946 | Leach | 180/209 |
| 3,236,323 A | * 2/1966 | Austin | 180/209 |
| 3,373,832 A | * 3/1968 | Summers | 180/226 |
| 3,700,059 A | 10/1972 | Sutton | 180/30 |
| 3,980,150 A | 9/1976 | Gigli | 180/30 |
| 4,133,402 A | 1/1979 | Soo Hoo | 180/30 |
| 4,181,190 A | * 1/1980 | Yang | 180/219 |
| 4,293,052 A | * 10/1981 | Daswick et al. | 180/219 |
| 4,423,795 A | 1/1984 | Winchell et al. | 180/215 |
| 4,484,648 A | 11/1984 | Jephcott | 180/210 |
| 4,513,837 A | 4/1985 | Archer | 180/209 |
| 4,691,798 A | 9/1987 | Engelbach | 180/209 |
| 4,826,194 A | 5/1989 | Sakita | 280/302 |
| 5,029,894 A | 7/1991 | Willman | 280/755 |
| 5,040,812 A | 8/1991 | Patin | 280/62 |
| 5,048,864 A | 9/1991 | Geiger | 280/755 |
| 5,378,020 A | 1/1995 | Horn | 280/755 |
| 5,465,989 A | 11/1995 | Grove | 280/250 |
| 5,685,388 A | 11/1997 | Bothwell et al. | 180/219 |
| 5,927,424 A | 7/1999 | Van Den Brink et al. | 180/216 |
| 6,006,849 A | 12/1999 | Watkins | 180/209 |
| 6,022,037 A | * 2/2000 | Code | 280/303 |
| 6,056,078 A | 5/2000 | Pham | 180/219 |
| 6,170,847 B1 | 1/2001 | Pham | 280/298 |
| 6,213,237 B1 | 4/2001 | Willman | 180/209 |
| 6,237,930 B1 | * 5/2001 | Code | 280/303 |

FOREIGN PATENT DOCUMENTS

| | | | |
|---|---|---|---|
| CH | 659 977 A5 | 6/1982 | |
| DE | 197 00 317 A1 | 7/1998 | |
| EP | 0 153 521 | 4/1984 | |
| EP | 0 097 623 | 3/1987 | |
| FR | 2 737 462 | 7/1995 | |
| GB | 158570 | 1/1921 | |
| GB | 854861 | 3/1958 | |
| JP | 57-47281 | 3/1982 | |
| JP | 02114076 | 10/1988 | |
| JP | 02003585 A | * 1/1990 | B62H/1/12 |
| JP | 03287478 A | * 12/1991 | B62H/1/02 |
| WO | WO 84/00337 | 2/1984 | |
| WO | WO 85/00568 | 2/1985 | |
| WO | WO 01/15961 A3 | 3/2001 | |
| WO | WO 01/46003 A1 | 6/2001 | |

* cited by examiner

Primary Examiner—Lesley D. Morris
Assistant Examiner—Paul Royal, Jr.
(74) Attorney, Agent, or Firm—Marks & Clerk

(57) ABSTRACT

Disclosed is a system for supporting a fore-and-aft wheeled vehicle in a generally upright stationary position, comprising a pair of laterally extending support legs independently moveable between a raised retracted position permitting normal motion of the vehicle and a lowered ground-engaging position, an operating lever responsive to user input to generate separate control inputs for displacing said respective support legs so as to permit independent movement thereof, actuator mechanisms responsive to the respective control inputs for displacing the support legs between the ground-engaging and retracted positions in response to user input.

18 Claims, 12 Drawing Sheets

BALANCE SYSTEM FOR AN ENCLOSED FORE-AND-AFT WHEELED VEHICLE

FIELD OF THE INVENTION

This invention is related to vehicles, and more particularly to a balance system for a motorcycle vehicle, as well as to a motorcycle vehicle employing the balance system.

BACKGROUND OF THE INVENTION

Conventional automobiles are two persons wide, and depend upon their track width for stability. A single-person wide automobile would be smaller and lighter, and therefore more efficient, but is too narrow at the same height, and is unstable cornering at speed. Motorcycles are efficient single-person width vehicles that achieve cornering stability by leaning. However, motorcycles also tend to be less safe, especially in crash situations, than their automobile counterparts. To make a motorcycle as comfortable and as safe as an automobile requires that it be enclosed, which then means that the operator can no longer use their legs to balance and support the vehicle when slowing and stopping.

Previous attempts to solve this problem have often relied on simple suspended outrigger wheels, or complicated balance control or suspension systems that allow three wheeled vehicles to lean and behave like two wheeled vehicles. Simple outrigger wheels do not behave well enough to be successful, particularly on uneven ground, and complicated systems are expensive, unreliable, and may present control difficulties while the vehicle is moving at higher speeds.

SUMMARY OF THE INVENTION

The balance system described herein is a relatively simple, direct mechanical system, that allows for easy, intuitive control of the balance struts. The operator controls the vehicle's dynamic balance while moving, and also controls the vehicle's static balance while stopping and starting. The operator also provides the motive force used to operate this static balance system, and therefore the force feedback is immediate and direct.

Since the balance system is retracted at all but the slowest speeds, the vehicle described here will perform at normal operating speeds as would a conventional motorcycle. Therefore, since conventional motorcycle dynamic behavior is well understood, it will be assumed that use of the vehicle described herein at normal traffic speeds will be understood.

Thus, according to one aspect, the invention provides a system for supporting a fore-and-aft wheeled vehicle in a generally upright stationary position, comprising a pair of laterally extending support legs independently moveable between a raised retracted position permitting normal motion of said vehicle and a lowered ground-engaging position, an operating lever responsive to user input to generate separate control inputs for displacing said respective support legs so as to permit independent movement thereof, and actuator mechanisms responsive to said respective control inputs for displacing said support legs between said ground-engaging and retracted positions in response to user input.

There are many advantages in using the fore-and-aft wheeled vehicle and balance system disclosed herein. The system is easy and intuitive to use, and provides as smooth a transition from dynamic motorcycle balance to static balance as possible. Unlike standard motorcycles where static balancing is typically achieved by deliberately tipping the bike to one side, onto one leg of the operator, with this system the vehicle can remain in a state of perfect upright balance. Perfect upright balance, or "tip-toe" balance results in almost all of the vehicle's weight being carried on the tires, and very little weight being held by the balancing support legs. This is a benefit in reducing the demands being asked of the support legs and the operator, who is providing the balancing force. Once "tip-toe" balance is achieved, it takes little effort to maintain it. Starting off is then a simple matter of opening the throttle, and then retracting the support legs. From a state of perfect "tip-toe" balance the vehicle will move away smoothly and directly, without initial wobble caused by raising the bike incorrectly from its leaned-over static state.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIGS. 13, 14, and 15 illustrate an optional automatic assist system that may be used to move the balance system of FIG. 6 from the retracted position to an intermediate "ready" position, and back again, in which FIG. 13 illustrates the assist system in the fully retracted position, FIG. 14 illustrates the assist system in an intermediate, ready position, and FIG. 15 illustrates the assist system in the fully extended position.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

Figure 1:
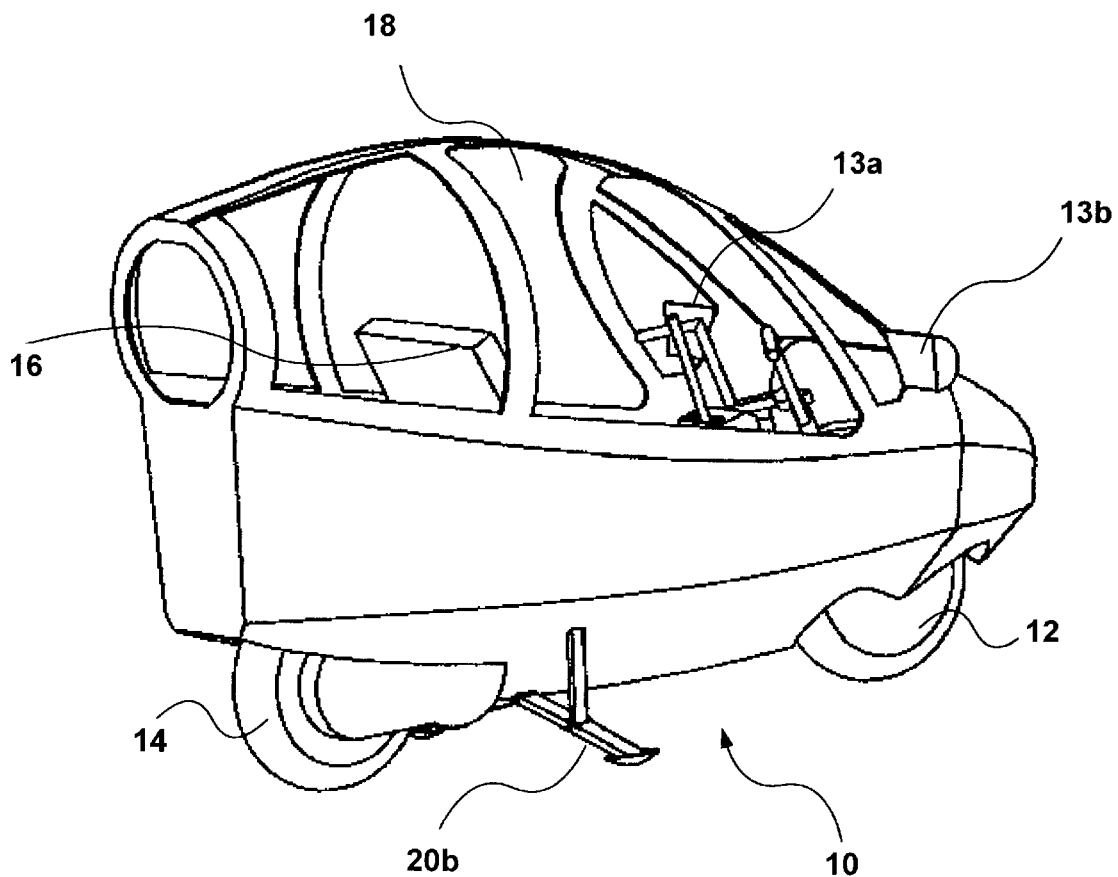
FIG. 1 illustrates an enclosed motorcycle vehicle in accordance with the present invention.

FIG. 1 illustrates an exemplary fore-and-aft wheeled vehicle according to this invention. The vehicle 10, or enclosed motorcycle includes standard motorcycle components such as a front wheel 12 and a rear wheel 14, rear-view mirrors 13a and 13b and at least one seat 16. If a second seat is included, the seats are aligned in tandem, to maintain the one-person width of the vehicle. The vehicle 10 further includes an enclosure 18 having window areas to facilitate visibility. The enclosed motorcycle 10 as described could be parked in one half to one third the space of a car. As vehicles generally spend much more of their lifetime parked than being driven, this space-saving could be an important factor in densely-populated cities.

The advantages the enclosed motorcycle 10 has over open motorcycles are safety in a crash, a more comfortable operator environment, and more useful internal space for transporting goods and/or a passenger.

While an enclosed motorcycle would weigh more than an open one, its performance could be similar or better due to improved aerodynamics. The increased weight also means more safety structure in a crash. With the addition of crumple zones, airbags and seatbelts, the occupant could have improved safety, without the necessity of wearing a helmet and protective leather clothing. The enclosed vehicle would be much quieter, allowing for automotive-type sound systems. It would have interior heating and cooling systems. This increases comfort, and increases safety from avoiding extremes of discomfort. The vehicle and its contents would be more secure than open motorcycles. Articles could be left anywhere inside, in locations that would be very accessible to the user, yet remain secure from theft from the outside, as the whole vehicle is closed and locked as with automobiles. The motorcycle includes a balance system which is described in detail below. The balance system includes a pair of laterally extending support legs 20a, 20b (only 20b being shown in FIG. 1)

Figure 2:
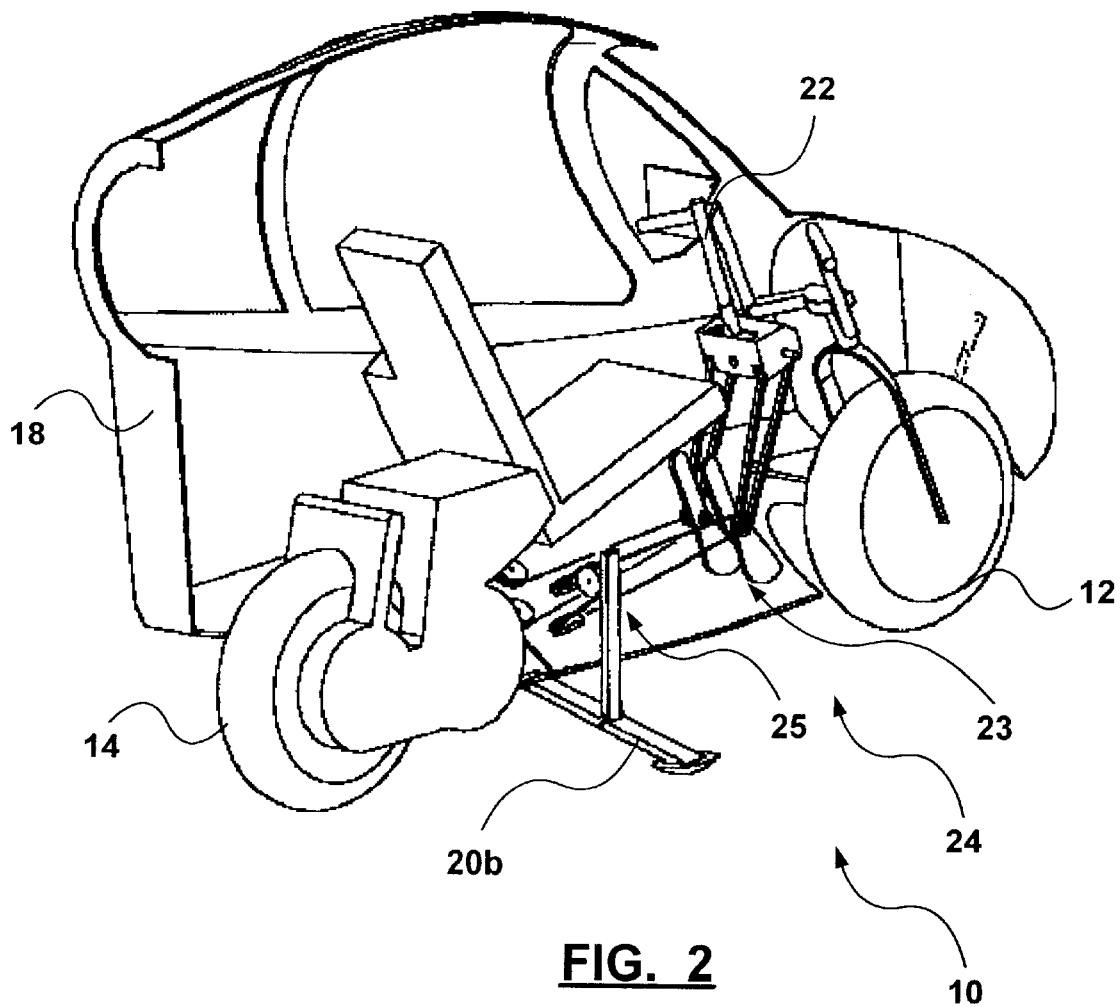
FIG. 2 illustrates the vehicle of FIG. 1 with a portion of the enclosure cut-away.

FIG. 2 illustrates vehicle 10 with part of the enclosure 18 cut-away, so as to illustrate some of the major components of the balance system. An input lever 22 is responsive to user input to generate separate control inputs for displacing the support legs 20a, 20b, so as to permit independent movement thereof. An actuator mechanism 24 is responsive to the control inputs for displacing the support legs 20a, 20b between a raised retracted position permitting normal motion of the vehicle, and a lowered ground-engaging position in response to user input. While one skilled in the art will recognize actuator mechanisms may take many forms, one preferred embodiment will be described in detail below.

In the ensuing description, directions such as left, right, forward and back are with respect to an operator of the vehicle 10 facing the front wheel 12.

Figure 3:
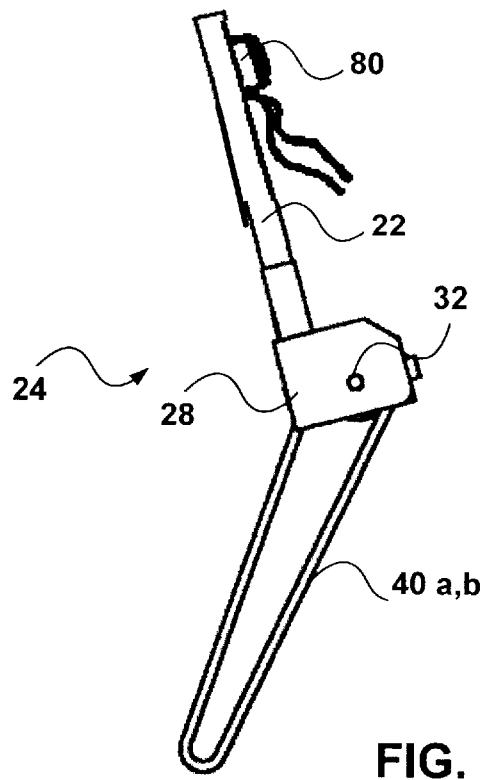
FIG. 3 illustrates a side view of a differential gear system used to control the balance system for a vehicle of FIG. 1.
Figure 4:
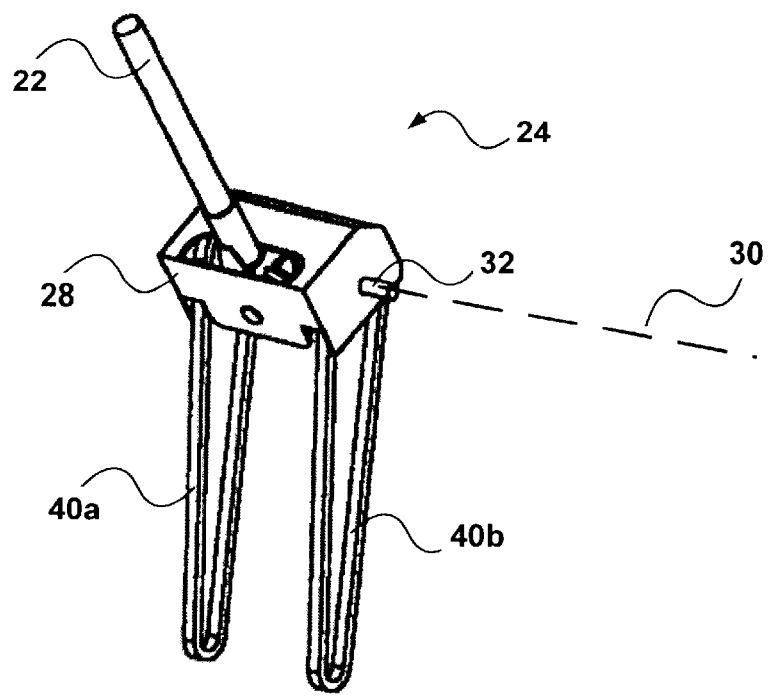
FIG. 4 is a three-dimensional view of the system of FIG. 3.

As mentioned above, the operator input of this balance or control system is via an actuator mechanism through a simple lever 22. In one embodiment, the actuator mechanism comprises a gear system 23 and a pulley system 25. Referring to FIGS. 3 and 4 the lever 22 is attached to a differential gearbox 28, centrally situated between the operator's knees. The gearbox 28 is supported on a pitch pivot axis 30 about side shaft 32, which is its only degree of freedom. The lever 22 is used to rotate the gearbox 28 about pitch axis 30. While the vehicle 10 is moving, the lever 22 and gearbox 28 are rotated fully forward, and the balance system is retracted. To deploy the balance system to a ground-engaging position, the operator reaches forward, grasps the lever 22, and pulls back. This pitches the gearbox backwards about axis 30, and the external support legs 20a, 20b will deploy and ultimately contact the ground when the input lever 22 is an approximately vertical position, a short distance in front of the operator's torso. The operator can directly sense, through the lever 22, the force being applied to the support legs 20a and 20b, and therefore to the ground.

Figure 5:
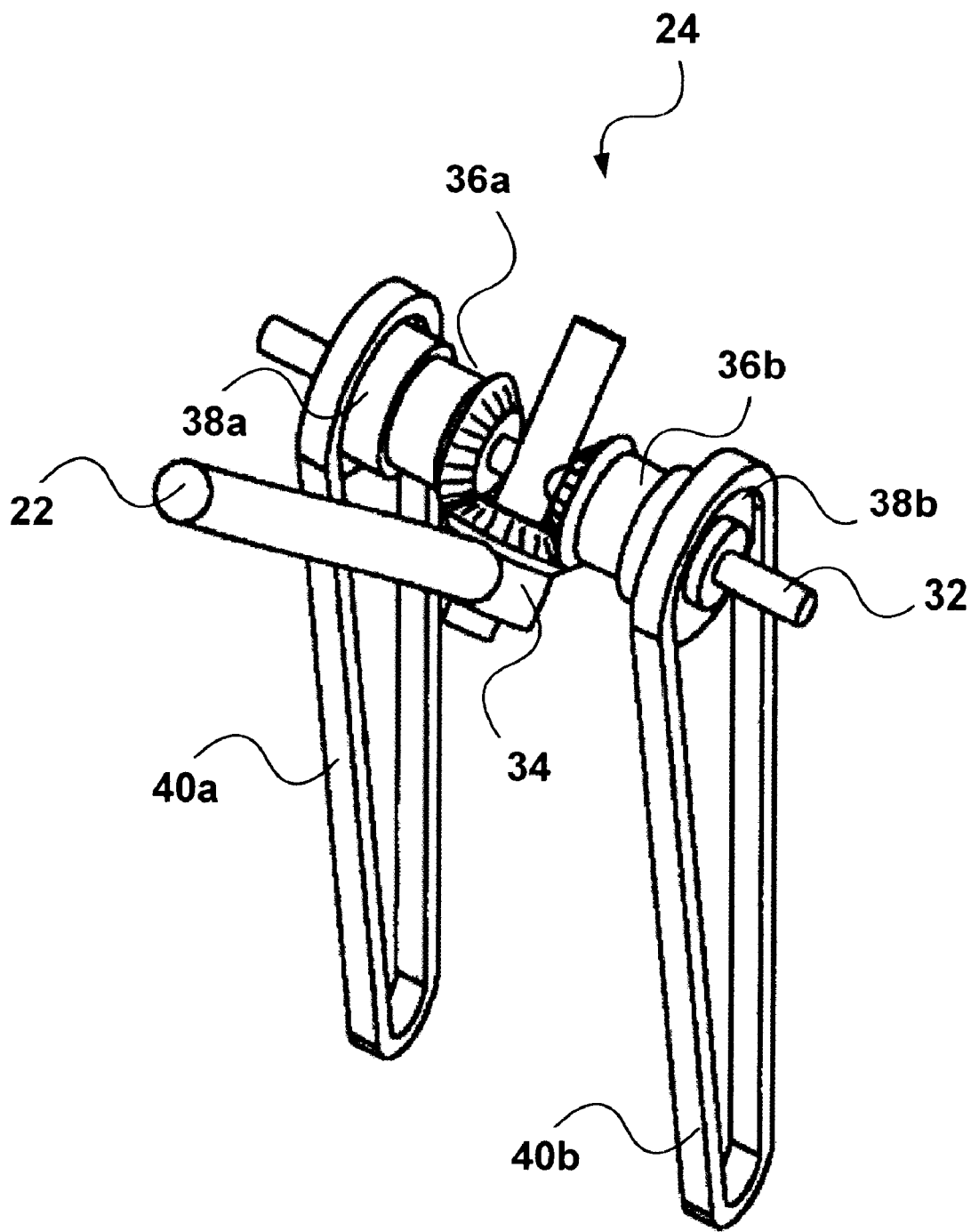
FIG. 5 illustrates is a three-dimensional view of the system of FIG. 3 with the gearbox removed.
Figure 11:
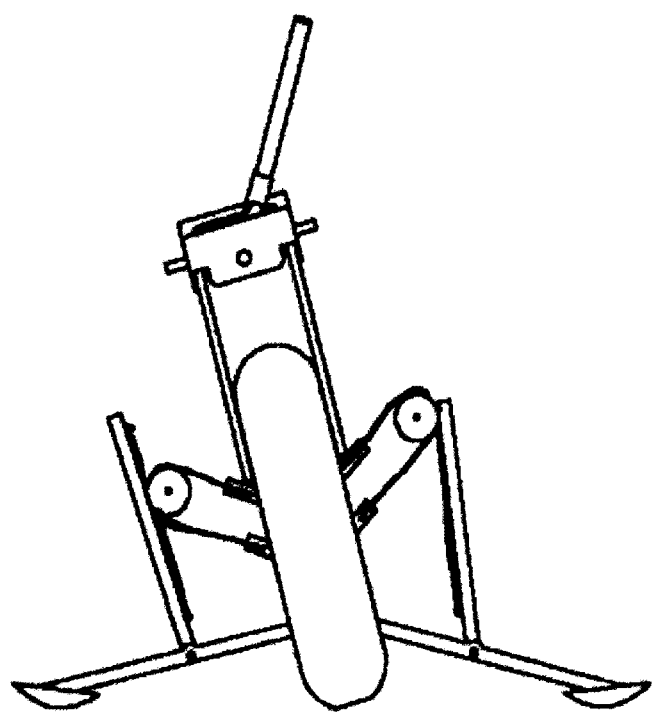
FIG. 11 illustrates the balance system of FIG. 6 in a position to lean the vehicle of FIG. 1 to the left, as viewed from the rear.

Referring to FIG. 5, there is shown the gear system 23 of FIGS. 3 and 4, in the retracted position, and with the gearbox 28 removed. The gearbox 28 contains three bevel gears: central bevel gear 34 and two side bevel gears 36a, 36b. The input level 22 is fastened to the center gear 34, which meshes with the side gears 36a, 36b. The lever 22 has a second, independent degree of freedom. The lever 22 may be pivoted side-to-side with respect to the gearbox 28. This applies a differential action through center bevel gear 34 and side bevel gears 36a, 36b, and results in a differential motion of the support legs 20a and 20b. Pushing the lever 22 to the right results in a further extension of the right support leg 20b, and allows for a corresponding retraction of the left support leg 20a. This action, while the legs 20a, 20b are in contact with the ground, will produce a reaction which will roll the vehicle 10 to the left, as illustrated in FIG. 11. Similarly, pushing the lever 22 to the left will roll the vehicle 10 to the right.

Since the fore-and-aft and side-to-side motions of the input lever 22 can occur both independently and simultaneously, stopping and balancing the vehicle 10 is achieved by a simple lever action, specifically; pulling the lever back until it stops.

If the vehicle 10 has leaned slightly, and/or if the ground may be a little uneven, one support leg may contact the ground before the other. In this case, one support leg will stop moving, and its corresponding side of the balance system will stop moving. The input lever 22 will however not stop, and will seamlessly and automatically continue to move both backwards and sideways until the other side of the system contacts the ground. At this point, both sides of the balance system, and the input lever 22, will stop moving. If the lever 22 is held stationary, and with sufficient backward force on the lever 22, the vehicle 10 will be held at its current lean angle. If the operator wishes to move the vehicle 10 into a more upright position, a sideways motion of the input lever 22 will achieve it. Sideways motion of the lever 22 is easy to accomplish while holding it in essentially the same fore-and-aft position.

Therefore, the control system in accordance with this invention allows for the accommodation of uneven ground. The only effect of stopping on a ridge or in a dip is that the lever will stop moving backward sooner or later than it would normally. This is somewhat unnoticeable to the operator, as he or she will simply pull back on the lever until it stops, in whichever position that may be. Similarly, stopping on a moderate side-slope will result in the lever stopping somewhat left or right of center, but this has little effect on the operator achieving and maintaining static balance of the vehicle.

One embodiment of the actuator mechanism also uses a simple mechanical cable-and-pulley actuation system 25 that joins the input lever 22 to the support legs 20a, 20b. However, other computer controlled electrical or hydraulic actuation systems are also easily implemented and remain within the scope of this invention. A cable-and-pulley system is preferred because the complexity, cost and potential unreliability of other types of systems are disadvantages in comparison to the simple mechanical cable system described herein.

Figure 6:
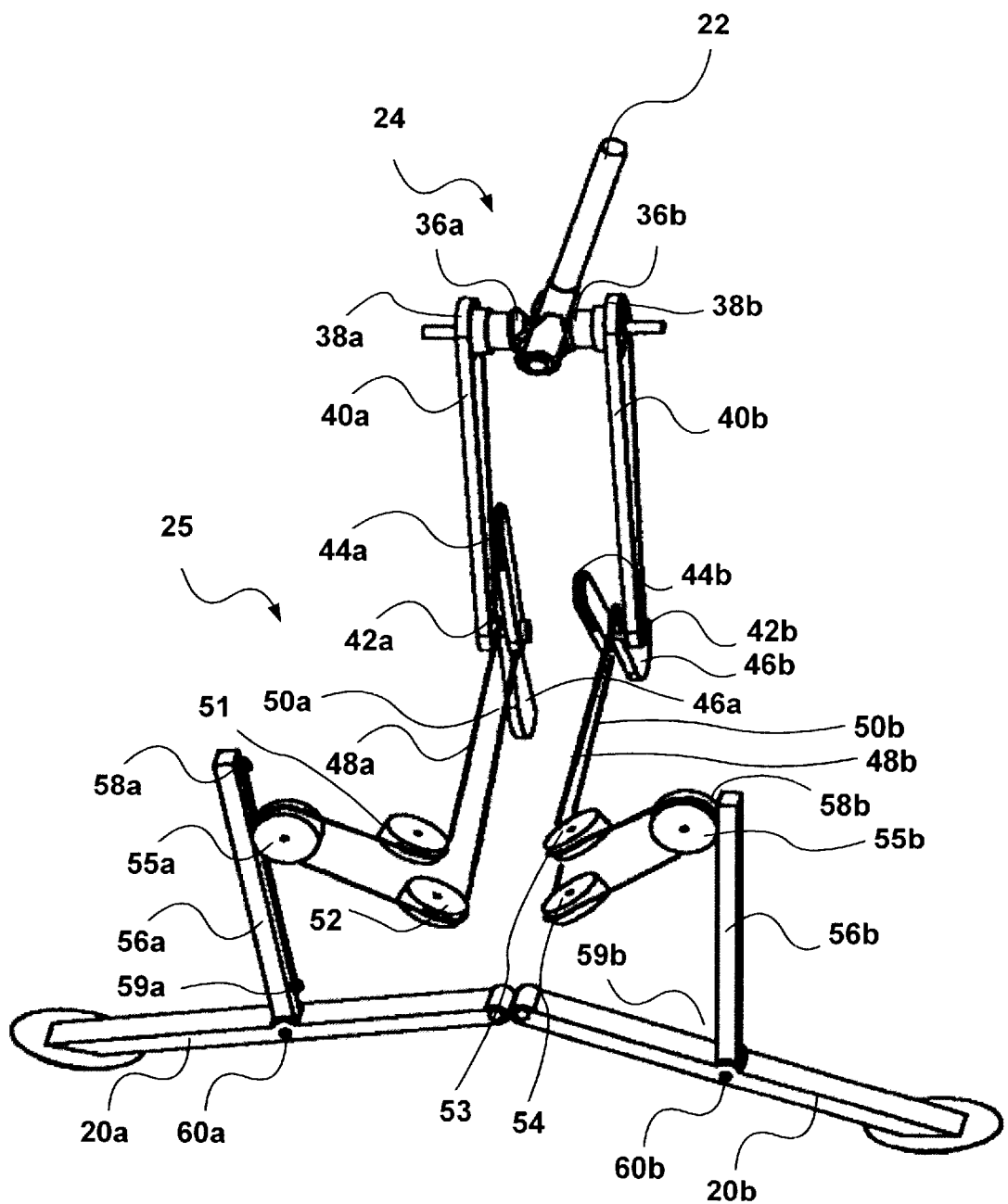
FIG. 6 illustrates a preferred embodiment of the balance system in accordance with the present invention.

Referring to FIG. 6, the differential gearbox system 24 and two support legs 20a, 20b are joined by a series of sprockets and chains, cables and pulleys 25. Each side gear 36a, 36b is fitted with sprockets 38a, 38b. The sprockets 38a, 38b are connected via a pair of chain loops 40a, 40b to a pair of driven sprockets 42a, 42b. Each driven sprocket 42a, 42b is connected to a pair of eccentric pulleys: an extension pulley 44a, 44b and a retraction pulley 46a, 46b. Retraction cables 48a, 48b and extension cables 50a, 50b are routed over a series of direction change pulleys 51, 52, 53, 54 and push-strut pulleys 55a, 55b. The cable ends are then fastened to each end of the generally vertically-moving push-struts 56a, 56b. Each extension cable 50a, 50b is attached near the upper-end of its corresponding push-strut 56a, 56b at cable attachment points 58a, 58b, respectively. Each retraction cable 48a, 48b is attached near the lower-end of its corresponding push-strut 56a, 56b at cable attachment points 59a, 59b, respectively.

Figure 7:
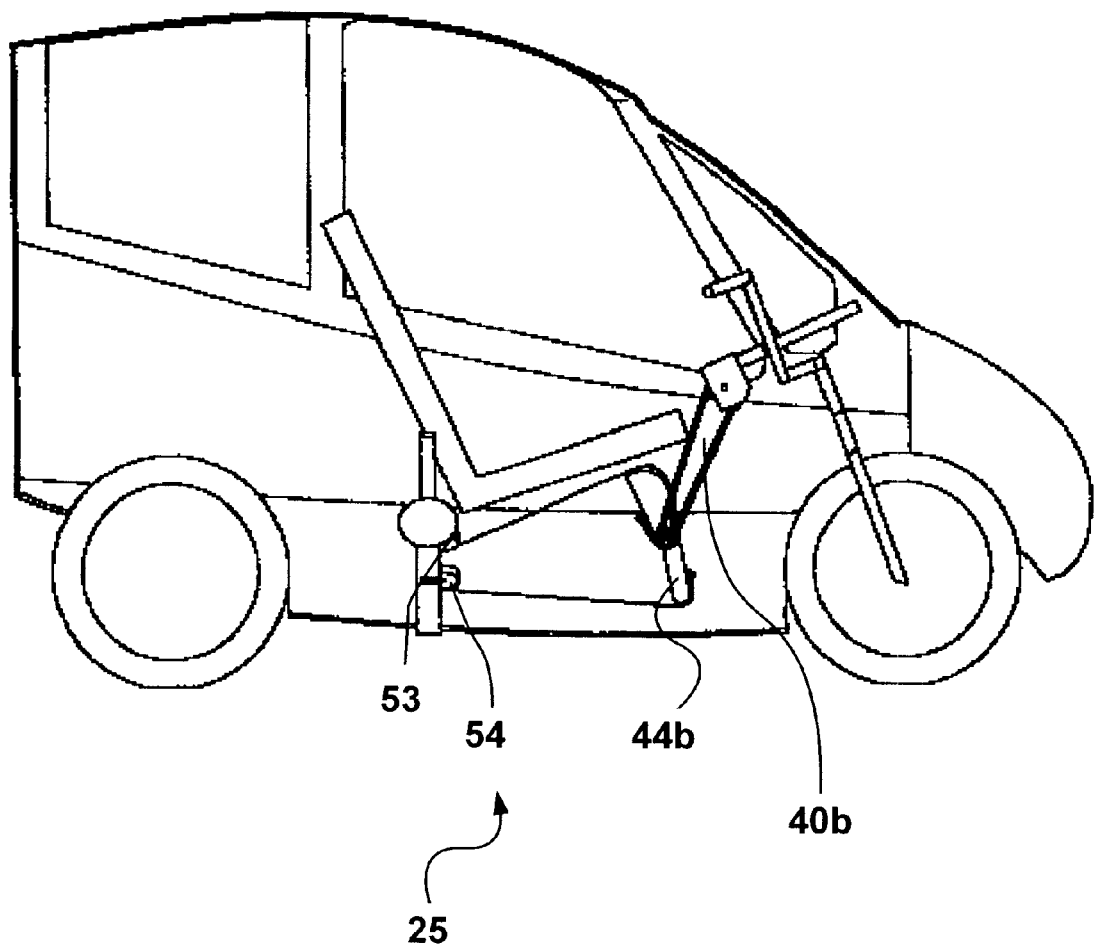
FIG. 7 illustrates the cable system used in a preferred embodiment with respect to the vehicle of FIG. 1.

The cable system is also seen in FIG. 7 with respect to the vehicle 10. The lower end of each push-strut 56a, 56b is pivotally joined near the middle of a support leg 20a, 20b at pivot point 60a, 60b, respectively. The support legs 20a, 20b have their inboard ends pivotally attached on, or near, the lower centerline of the vehicle. The outboard ends of the support legs terminate in saucer-shaped ground engaging pads. The legs could also terminate in rollers or wheels, with or without a castering action.

Figure 8:
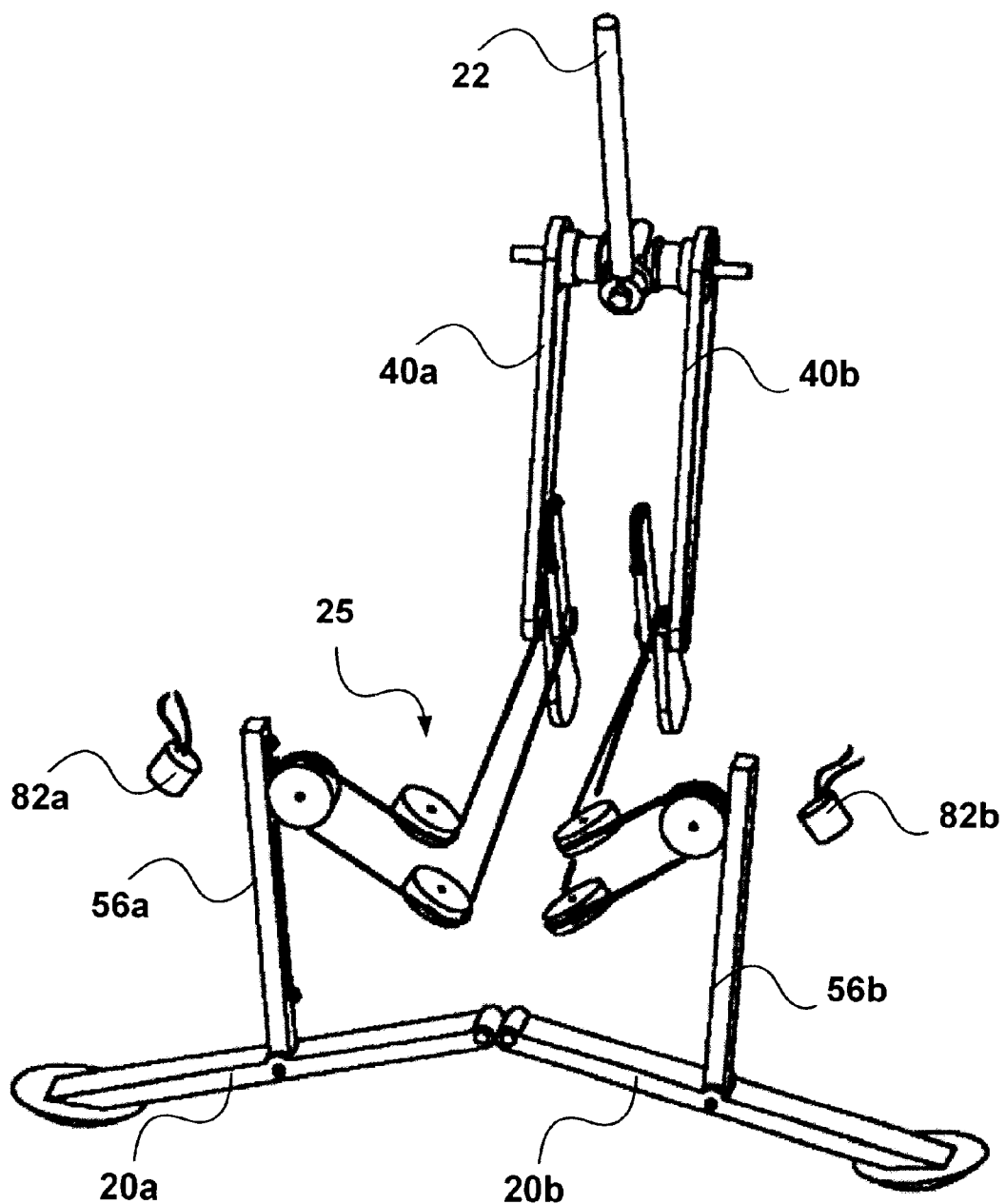
FIG. 8 illustrates the balance system of FIG. 6 in an extended position.

FIG. 8 illustrates the balance system in the extended ground-engaging position. When the vehicle 10 is moving, the support legs 20a, 20b are in the fully retracted, or raised, position. As the operator stops the vehicle 10, he or she extends the support legs 20a, 20b by pulling back on the input lever 22. As the lever 22 is pulled back by the operator, the entire gearbox 28 rotates to the rear, pivoting on a side-to-side shaft 32. Inside the gearbox 28, the two side-gears 36a, 36b and their driving sprockets 38a, 38b also rotate to the rear. This action is transmitted through the chain loops 40a, 40b to the driven sprockets 42a, 42b, and corresponding eccentric cable pulleys 44a, 44b. The extension pulleys 44a, 44b on both sides pull on their respective cables 50a, 50b. The tension, and cable motion, is transmitted around the direction change pulleys 51, 52, 53, 54, and finally to the cable-end attachments 58a, 58b at the upper end of the push-struts 56a, 56b. The tension in the chains and cables is turned into compressive forces in the push-struts 56a, 56b. These forces cause the outboard ends of the support legs to move downward. As the lever continues to be pulled back, the support legs will move freely until both pads contact the ground.

Figure 9:
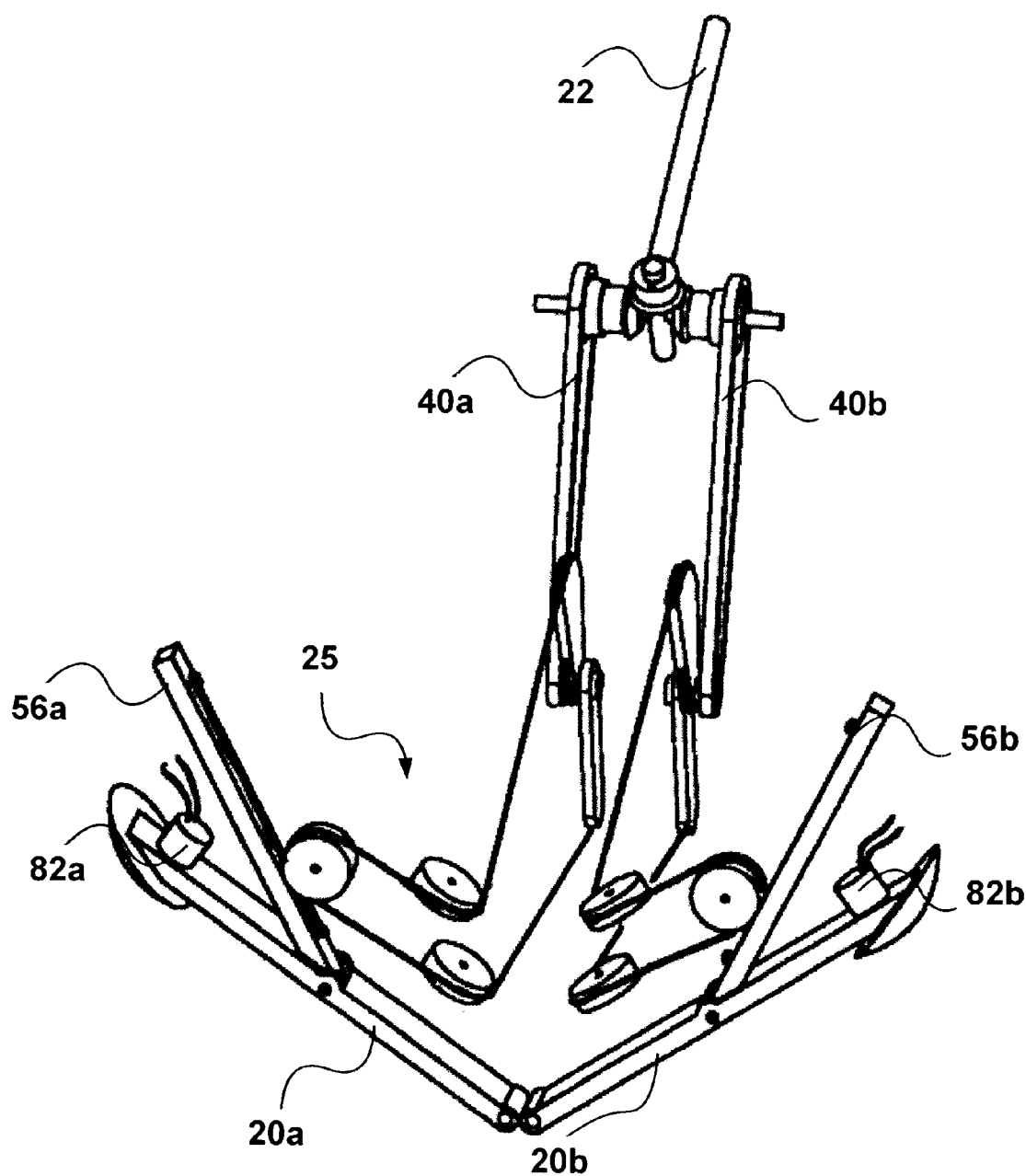
FIG. 9 illustrates the balance system of FIG. 6 in a retracted position.

FIG. 9 illustrates the balance system in the retracted position. Retracting the support legs 20a, 20b reverses the above motions. Pushing on the input lever 22 rotates the sprockets 42a, 42b and pulleys 46a, 46b forward, and the retraction cables 48a, 48b will pull up on the lower ends of the push-struts 56a, 56b, which in turn pull upwards on the support legs 20a, 20b. Note that in these motions, both the left and right sides of the system are moving together, and both support legs are moving up or down together.

The pulleys 44a, 44b are eccentric, with varying radii, allowing the resulting motion of cables 50a and 50b to be optimized relative to the motion of the input lever 22. A large effective pulley radius at the point at which the cable exits the pulley is used to impart maximum cable motion, and a small effective radius at the cable exit point is used to impart maximum cable force. Generally, the initial backward movement of the balance lever 22 is optimized through a large effective pulley radius to provide maximum downward movement of the support legs 20a, 20b, while they are moving through the air. Later in the motion of balance lever 22, the effective cable exit radii of pulleys 44a, 44b are reduced. The reduced cable exit radii results in reduced relative movement of support legs 20a, 20b in favor of increased relative force, or mechanical leverage, available for balancing the vehicle with the support legs now in contact with the ground.

Figure 10:
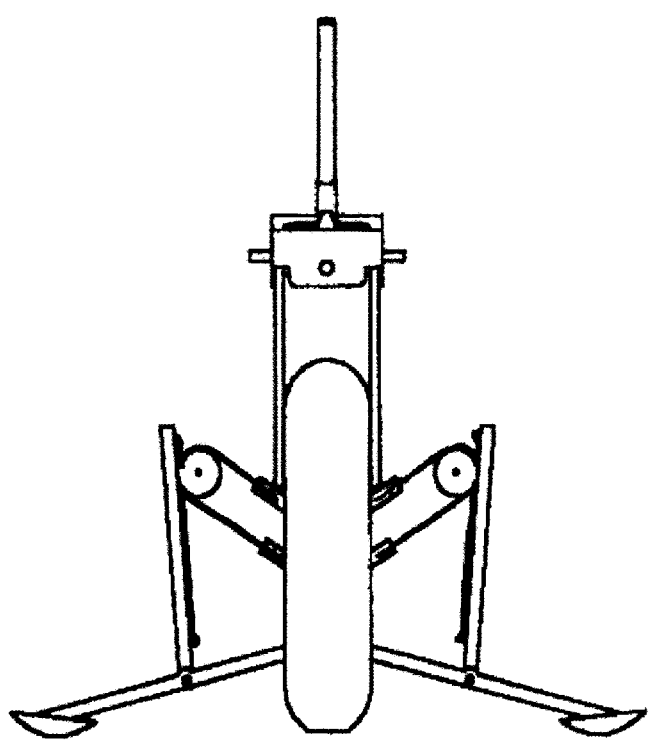
FIG. 10 illustrates the balance system of FIG. 8 as viewed from the rear.

As previously discussed, the lever 22 has a second degree of freedom. The lever 22 may be pivoted side-to-side with respect to the gearbox 28. This applies a differential action through the gears, and results in a differential motion of the support legs. FIG. 10 illustrates the system with the support legs 20a, 20b extended and the lever 22 in a vertical position. Referring to FIG. 10 pushing the lever 22 to the right rotates the center gear (not seen in the Figure) to the right, and results in the right side gear 36b rotating an additional amount to the back, and the left side gear 36a rotating forward the same amount. This results in a further extension of the right support leg 20b, and allows for a corresponding retraction of the left support leg 20a. This action, while the support legs are in contact with the ground, will produce a reaction which will roll the vehicle to the left, rotating about the axis defined by the tire-ground contact patches. This result is illustrated in FIG. 11. Similarly, pushing the lever 22 to the left will roll the vehicle to the right (not shown).

Figure 12:
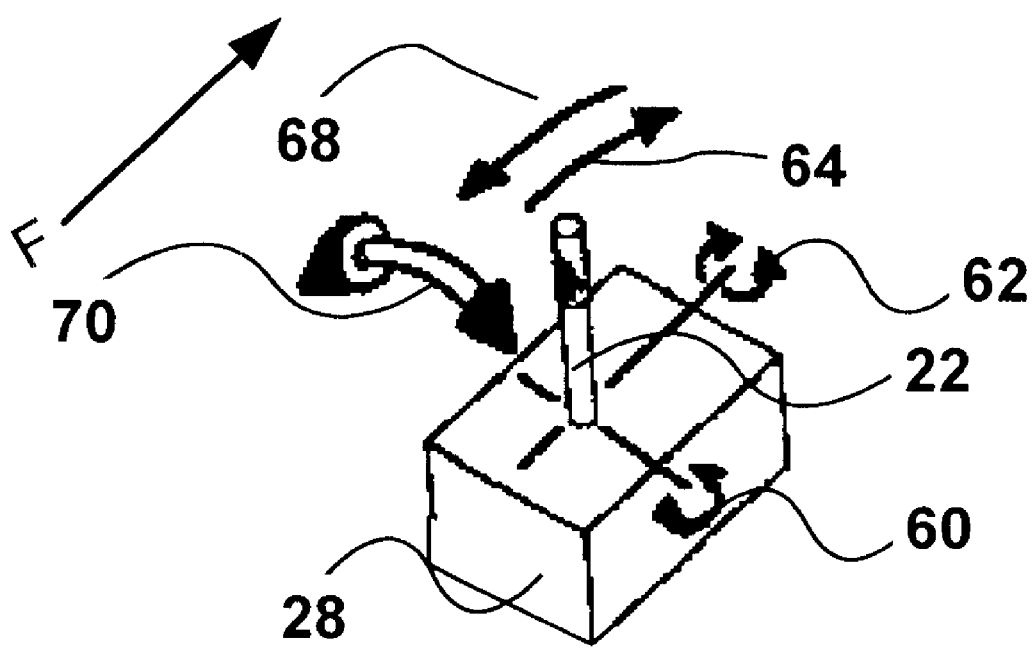
FIG. 12 illustrates the possible directional movements of the balance system of the vehicle of FIG. 1.

FIG. 12 illustrates the major components of the balance system and the possible control motions used by the operator as described above. Arrow F indicates the direction of the front of the vehicle. The first degree of freedom of the balance lever 22 and gearbox 28 is the pitch axis, illustrated by arrow 60, and the second degree of freedom of the lever 22 is a generally longitudinal axis illustrated by arrow 62. Arrow 64 illustrates the directional movement of lever 22 for retracting the support legs, while arrow 68 illustrates the directional movement of lever 22 for extending them. The double-ended arrow 70 illustrates the directional movements of lever 22, for balancing the vehicle 10 while the support legs 20 are extended.

Figure 13:
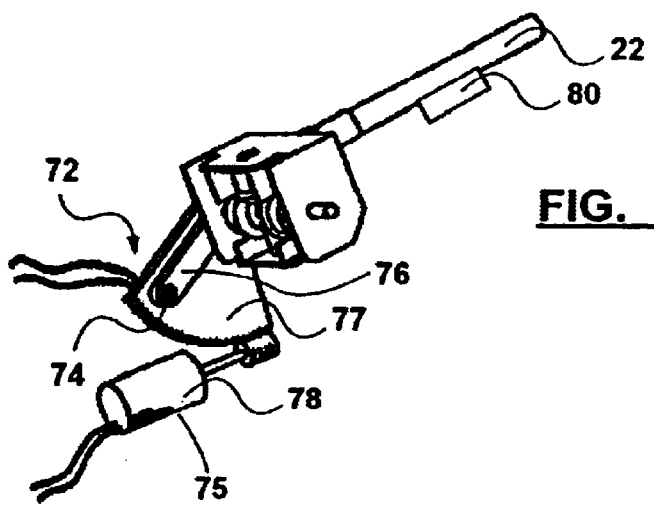
Figure 14:
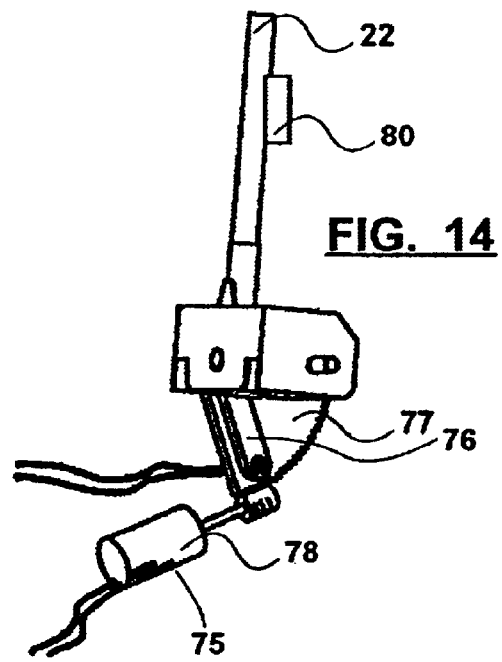
Figure 15:
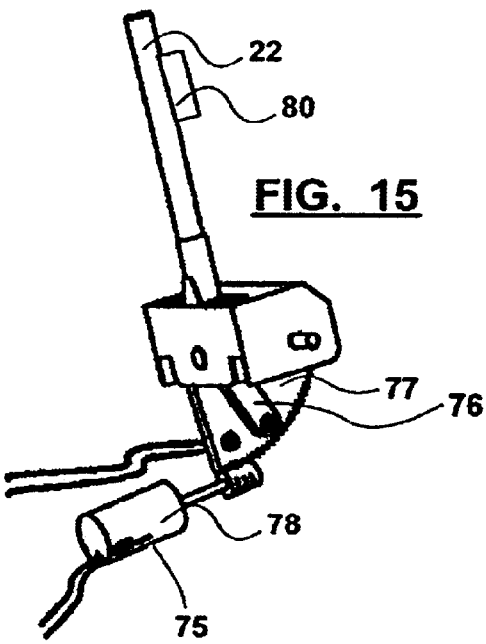

It would be very convenient, but not necessary, to make the actuator mechanism 24 semi-automatic, meaning that the balance system would deploy from the fully-retracted position to an intermediate "ready" position, in relation to a slow speed signal. This would make the input lever 22 easy to reach and put away. Referring to FIGS. 13–15, this can be achieved with an electric-motor driven automatic assist system 72 with an electromagnetic coupling 74 to a lower extension of the gearbox 76. FIG. 13 illustrates this system in the fully retracted position. Vehicle speed sensors 75 (shown schematically) direct motor 78 to drive gear sector 77 to place input lever 22 into the "ready" position at the appropriate speed, and/or take it away again upon increasing speed as seen in FIG. 14.

The motor-drive 78, could be magnetically de-coupled by a disengagement switch 80 on the input lever 22. In FIG. 15, the operator has grasped the input lever 22, depressing the disengagement switch 80. The electromagnetic coupling 74 is disengaged, allowing the operator to take-over pulling the lever 22 to the back, to complete the extension of the support legs 20a, 20b.

The support legs 20a, 20b could also be held in the fully up and locked position by a pair of electromagnetic catches 82a, 82b in FIGS. 8 and 9. These catches would normally be released by the automatic system, but they could also be released at any time by the disengagement switch 80. The operator action of grasping the input lever 22, thereby pressing the disengagement switch 80, provides the signal to the machine that the operator has taken control of the balance system.

Figure 16:
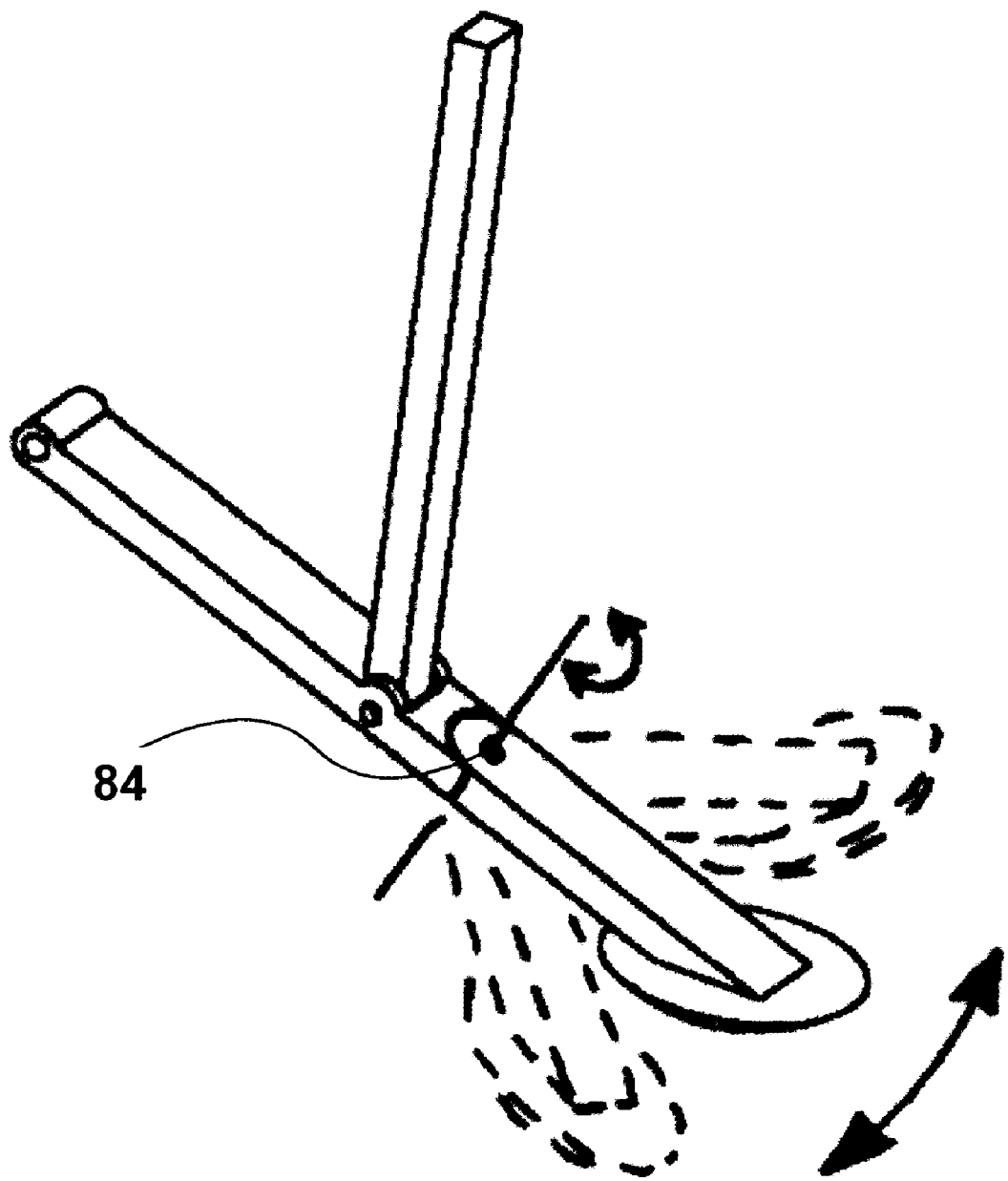
FIG. 16 illustrates a safety pivot in a support leg of the vehicle in FIG. 1.

The support legs can have spring-centered vertical-axis safety pivots 84 built into them, as illustrated in FIG. 16. This would allow for a break-away safety function, self-recovered by the springs, if the support legs were to hit an obstruction in a horizontal direction, say due to forward or backward movement of the vehicle. The orientation of the pivot axis would ensure the support legs would have no loss of strength in the vertical direction.

The balance lever preferably has a parking lock (not shown), to allow the vehicle to be left upright and unattended. Any suitable means may be used. A mechanical means may be used to mechanically lock the position of the lever and gearbox, the support legs, or any other suitable part of the balance system. The lock could also possibly react to the hanging vehicle suspension hieght when the operator's weight is removed from the vehicle.

The vehicle that results in accordance with the teachings of this invention can be an enclosed vehicle, of a size and power similar to some contemporary higher-powered motor-scooters. The vehicle could be powered by an internal-combustion engine of about 350 cc to 750 cc, and run on about 20" diameter tires, with about a 65" wheel-base. The vehicle body would be about 8 feet long, 55" high, and 34" wide. It could weigh about 800 to 1000 lbs., about half the weight of a car. It could be sold for less than many automobiles, would consume less fuel, use less space to run and park, and would be fun to drive.

Numerous modifications may be made without departing from the spirit and scope of the invention as defined in the appended claims.

What is claimed is:

1. A system for supporting a fore-and-aft wheeled vehicle in a generally upright stationary position, comprising:
   a pair of laterally extending support legs independently moveable between a raised retracted position permitting normal motion of said vehicle and a lowered ground-engaging position;
   an operating lever responsive to user input to generate separate control inputs for displacing said respective support legs so as to permit independent movement thereof; and
   an actuator mechanism responsive to said respective control inputs for displacing said support legs between said ground-engaging and retracted positions in response to user input.

2. The system of claim 1, wherein the actuator mechanism comprises a gear system in communication with the operating lever, to position the support legs.

3. The system of claim 2, wherein the gear system includes a differential gearbox having a pitch axis, the lever being mounted to the box such that rotation of the lever about the pitch axis moves the support legs between said ground-engaging and retracted positions.

4. The system of claim 3, wherein the lever is rotated fully rearward when the legs are in said ground-engaging position.

5. The system of claim 3, wherein the gearbox includes a central bevel gear and two side bevel gears on either side of the central gear, such as to provide side to side movement of the lever.

6. The system of claim 2, further comprising a cable and pulley actuation system in communication between the gear system and the support legs to position the support legs in response to the gear system.

7. The system of claim 6, wherein the cable and pulley system includes a cable in communication with each side sprocket at one end and being supported by respective pulleys to a second end mounted to each supporting leg.

8. The system of claim 6, wherein the cable and pulley system includes an eccentric pulley for controlling the motion of the cable.

9. The system of claim 7, wherein when the legs are in the ground-engaging position, the lever is rotated fully rearward and the cables each pull a respective supporting leg to the ground.

10. The system of claim 6, wherein the legs are further positionable in an intermediate ready position.

11. The system of claim 10, further comprising a control system including vehicle speed sensors and a motor drive system responsive to the vehicle speed sensors such that upon a slow speed signal, the motor drive system places the support legs in the ready position.

12. The system of claim 11, further comprising electromagnetic catches for locking the support legs in the retracted position.

13. The system of claim 1, further comprising a break-away system on the support legs.

14. The system of claim 1, further comprising a lock to lock the supporting legs in any position.

15. The system of claim 14, wherein the lock is a mechanical means for locking the lever and gearbox in position.

16. A system for supporting a fore-and-aft wheeled vehicle in a generally upright stationary position, comprising:
   a pair of laterally extending support legs independently moveable between a raised retracted position permitting normal motion of said vehicle and a lowered ground-engaging position;
   an operating lever responsive to user input to generate separate control inputs for displacing said respective support legs so as to permit independent movement thereof;
   a gear system in communication with the operating lever, to position the support legs; and
   a positioning system communicating between the gear system and the support legs.

17. The system of claim 16, wherein the positioning system is a mechanical cable/pulley system.

18. An enclosed motor cycle vehicle having a balance system comprising:
   a pair of laterally extending support legs independently moveable between a raised retracted position permitting normal motion of said vehicle and a lowered ground-engaging position;
   an operating lever responsive to user input to generate separate control inputs for displacing said respective support legs so as to permit independent movement thereof; and
   an actuator mechanism responsive to said respective control inputs for displacing said support legs between said ground-engaging and retracted positions in response to user input.

* * * * *